US009020255B2

(12) United States Patent
Watanuki

(10) Patent No.: US 9,020,255 B2
(45) Date of Patent: Apr. 28, 2015

(54) IMAGE PROCESSING APPARATUS, IMAGE PROCESSING METHOD, AND STORAGE MEDIUM

(75) Inventor: Masatoshi Watanuki, Sagamihara (JP)

(73) Assignee: Casio Computer Co., Ltd., Tokyo (JP)

(*) Notice: Subject to any disclaimer, the term of this patent is extended or adjusted under 35 U.S.C. 154(b) by 84 days.

(21) Appl. No.: 13/434,342

(22) Filed: Mar. 29, 2012

(65) Prior Publication Data
US 2012/0250996 A1 Oct. 4, 2012

(30) Foreign Application Priority Data

Mar. 31, 2011 (JP) ................................ 2011-078901
Dec. 21, 2011 (JP) ................................ 2011-280553

(51) Int. Cl.
*G06K 9/00* (2006.01)
*H04N 1/62* (2006.01)

(52) U.S. Cl.
CPC ...................................... *H04N 1/62* (2013.01)

(58) Field of Classification Search
CPC .......... G09G 5/003; G09G 2320/0673; G09G 2320/0693; G06K 9/3233; G06K 9/4628; G06K 9/00255; H04N 5/23219; H04N 5/23293; H04N 1/62
USPC ......... 382/131, 162, 113, 165, 214, 219, 220, 382/260, 263, 284, 238; 345/639, 650, 671
See application file for complete search history.

(56) References Cited

U.S. PATENT DOCUMENTS

| 5,611,027 | A  | * | 3/1997 | Edgar ........................... 715/853 |
| 5,621,868 | A  |   | 4/1997 | Mizutani et al. |
| 5,684,509 | A  | * | 11/1997 | Hatanaka et al. ............. 345/615 |
| 5,844,565 | A  |   | 12/1998 | Mizutani et al. |
| 6,201,548 | B1 | * | 3/2001 | Cariffe et al. ................. 345/620 |
| 6,476,821 | B2 | * | 11/2002 | Sawada et al. ................ 345/620 |
| 7,082,227 | B1 |   | 7/2006 | Baum et al. |
| 7,602,991 | B2 | * | 10/2009 | Kokemohr ..................... 382/260 |
| 7,853,078 | B2 | * | 12/2010 | Fujii ............................. 382/167 |
| 7,945,113 | B2 | * | 5/2011 | Hayaishi ....................... 382/274 |
| 7,970,233 | B2 | * | 6/2011 | Kokemohr ..................... 382/274 |

(Continued)

FOREIGN PATENT DOCUMENTS

| CN | 1592915 A | 3/2005 |
| JP | 1-46905 A | 10/1989 |

(Continued)

OTHER PUBLICATIONS

Japanese Office Action dated Apr. 23, 2013 (and English translation thereof) in counterpart Japanese Application No. 2011-280553.

(Continued)

*Primary Examiner* — Mekonen Bekele
(74) *Attorney, Agent, or Firm* — Holtz, Holtz, Goodman & Chick PC

(57) ABSTRACT

An image processing apparatus includes an emphasis map creation module configured to create an emphasis map indicating an emphasis region of image data and an emphasis level of the emphasis region, and an image processor configured to perform a first conversion of a tone of image data of the emphasis region into a first tone and a second conversion of a tone of image data of another region into a second tone, in accordance with the emphasis map created by the emphasis map creation module.

9 Claims, 11 Drawing Sheets

(56) References Cited

U.S. PATENT DOCUMENTS

| | | | |
|---|---|---|---|
| 8,004,536 B2 * | 8/2011 | Wilensky | 345/589 |
| 8,355,070 B2 * | 1/2013 | Shiohara | 348/333.12 |
| 8,463,034 B2 | 6/2013 | Sambongi et al. | |
| 2003/0099411 A1 * | 5/2003 | Kokemohr | 382/309 |
| 2003/0108240 A1 | 6/2003 | Gutta et al. | |
| 2003/0174890 A1 * | 9/2003 | Yamauchi | 382/199 |
| 2004/0197027 A1 | 10/2004 | Kokemohr | |
| 2005/0047684 A1 | 3/2005 | Baum et al. | |
| 2005/0122533 A1 * | 6/2005 | Nakagawa | 358/1.9 |
| 2005/0147314 A1 | 7/2005 | Kokemohr | |
| 2006/0114505 A1 | 6/2006 | Fitzpatrick et al. | |
| 2006/0132867 A1 * | 6/2006 | Sugiyama et al. | 358/504 |
| 2006/0170707 A1 | 8/2006 | Kokemohr | |
| 2007/0130539 A1 * | 6/2007 | Yamagishi et al. | 715/800 |
| 2008/0024643 A1 * | 1/2008 | Kato | 348/333.01 |
| 2008/0031495 A1 * | 2/2008 | Saijo et al. | 382/115 |
| 2008/0131010 A1 | 6/2008 | Wilensky | |
| 2009/0195558 A1 | 8/2009 | Fitzpatrick et al. | |
| 2009/0195832 A1 | 8/2009 | Fitzpatrick et al. | |
| 2009/0196528 A1 | 8/2009 | Fitzpatrick et al. | |
| 2009/0207269 A1 | 8/2009 | Yoda | |
| 2009/0245625 A1 * | 10/2009 | Iwaki et al. | 382/159 |
| 2009/0245626 A1 * | 10/2009 | Norimatsu et al. | 382/164 |
| 2010/0027908 A1 | 2/2010 | Kokemohr | |
| 2010/0303379 A1 | 12/2010 | Kokemohr | |
| 2011/0216974 A1 | 9/2011 | Kokemohr | |

FOREIGN PATENT DOCUMENTS

| | | | |
|---|---|---|---|
| JP | 6-078332 A | 3/1994 | |
| JP | 7-322054 A | 12/1995 | |
| JP | 8-44867 A | 2/1996 | |
| JP | 10-032723 A | 2/1998 | |
| JP | 2000-261646 A | 9/2000 | |
| JP | 2001-057630 A | 2/2001 | |
| JP | 2002-118737 A | 4/2002 | |
| JP | 2002-298136 A | 10/2002 | |
| JP | 2002-325171 A | 11/2002 | |
| JP | 2003-290170 A | 10/2003 | |
| JP | 2003-334194 A | 11/2003 | |
| JP | 2004-021374 A | 1/2004 | |
| JP | 2004-213598 A | 7/2004 | |
| JP | 2005-512203 A | 4/2005 | |
| JP | 2009-194687 A | 8/2009 | |
| JP | 2009-237927 A | 10/2009 | |
| JP | 2010-081050 A | 4/2010 | |
| JP | 2010-521719 A | 6/2010 | |
| JP | 2011-243187 A | 12/2011 | |

OTHER PUBLICATIONS

Extended European Search Report (EESR) dated May 13, 2013 (in English) issued in counterpart European Application No. 12161937.3.

Miyake Y. et al.: "Facial Pattern Detection and Color Correction from Television Picture for Newspaper Printing": Journal of Imaging Technology: col. 16, No. 5: Oct. 1, 1990: Four Pages (in English).

Japanese Office Action dated Jan. 7, 2014 (and English translation thereof) in counterpart Japanese Application No. 2011-280553.

Chinese Office Action dated Jul. 21, 2014, issued in counterpart Chinese Application No. 201210081996.4.

* cited by examiner

FIG.3A

| A1 | A2 | A3 |
|----|----|----|
| A4 | A5 | A6 |
| A7 | A8 | A9 |

FIG.3B

| A1 | A2 | A3 |
|----|----|----|
| A4 | A5 | A6 |
| A7 | A8 | A9 |

FIG.3C

| A1 | A2 | A3 |
|----|----|----|
| A4 | A5 | A6 |
| A7 | A8 | A9 |

FIG.3D

| | | | | |
|--|--|--|--|--|
| | A1 | A2 | A3 | |
| | A4 | A5 | A6 | |
| | A7 | A8 | A9 | |
| | | | | |

FIG.3E

| | | | | |
|--|--|--|--|--|
| | A1 | A2 | A3 | |
| | A4 | A5 | A6 | |
| | A7 | A8 | A9 | |
| | | | | |

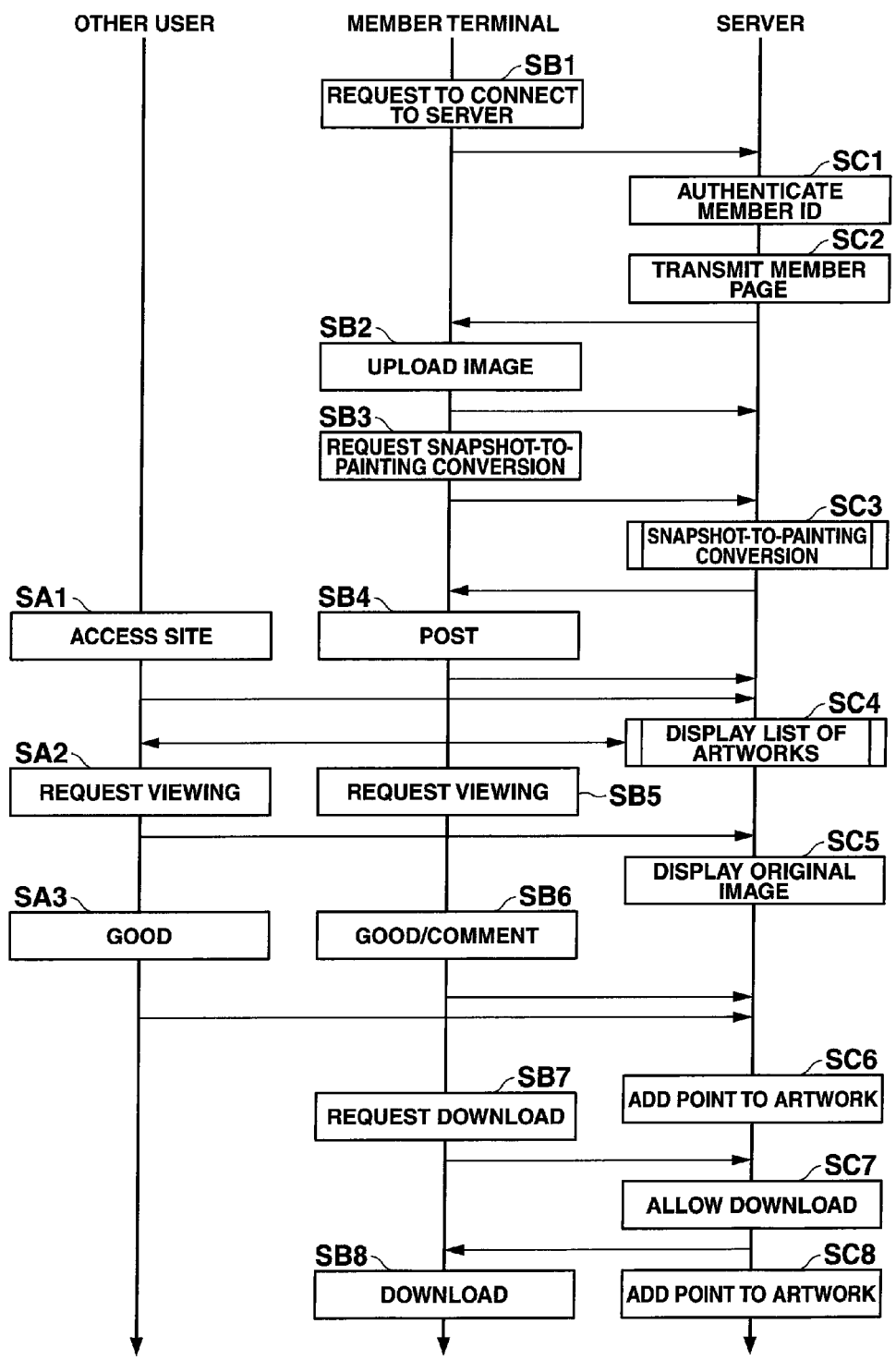

IMAGE PROCESSING APPARATUS, IMAGE PROCESSING METHOD, AND STORAGE MEDIUM

CROSS-REFERENCE TO RELATED APPLICATIONS

This application is based upon and claims the benefit of priority from prior Japanese Patent Applications No. 2011-078901, filed Mar. 31, 2011; and No. 2011-280553, filed Dec. 21, 2011, the entire contents of all of which are incorporated herein by reference.

BACKGROUND OF THE INVENTION

1. Field of the Invention

The present invention relates to an image processing apparatus, an image processing method, and a storage medium, which converts a photographic image into a painting image in accordance with an emphasis of regions which form image data.

2. Description of the Related Art

In recent years, people have enjoyed photographs in increasingly various ways, with spread of digital cameras. In particular, since image data of digital cameras are digital image data, various image processing can be performed.

For example, a technique of generating and displaying an image featuring a different tone (such as a painting image) based on an original photograph, by adding image processing to the original photograph, has been proposed (for example, see Jpn. Pat. Appln. KOKAI Publication No. 8-44867).

By developing the technique of Jpn. Pat. Appln. KOKAI Publication No. 8-44867, it has been proposed to extract characteristics such as color information and stroke information from an image of a picture which is actually drawn by a painter, providing a taken photograph with the extracted characteristics, and thereby converting the photograph into an artistic painting image in consideration of the whole original image (for example, see Jpn. Pat. Appln. KOKAI Publication No. 2004-213598).

Besides, a technique of converting the photograph by changing the image tone such as pictorial tone has been proposed (for example, see Jpn. Pat. Appln. KOKOU Publication No. 1-46905).

In addition, it has been proposed to perform tone change such as pictorial tone in a network service site, to which a terminal can be connected through the Internet (for example, see Jpn. Pat. Appln. KOKAI Publication No. 2011-243187).

However, when a photograph is converted into a painting image, the photograph includes an emphasis region such as a center part and a face, and a region which is not very important such as a peripheral part. In addition, the emphasis region is not only a face and a center part, but may be a central subject which the user wishes to take, such as a car and a flower. Specifically, it is desirable to emphasize the emphasis region in the converted image, specifically, differentiate the emphasis region in appearance from the other region. The techniques of prior art, however, have the problem that the whole photograph is uniformly converted.

BRIEF SUMMARY OF THE INVENTION

An object of the present invention is to provide an image processing apparatus, an image processing method and a storage medium, which can differentiate an emphasis region from the other region in appearance in the converted image.

According to one embodiment of the present invention, an image processing apparatus includes an emphasis map creation module configured to create an emphasis map indicating an emphasis region of image data and an emphasis level of the emphasis region, and an image processor configured to perform a first conversion of a tone of image data of the emphasis region into a first tone and a second conversion of a tone of image data of another region into a second tone, in accordance with the emphasis map created by the emphasis map creation module.

According to another embodiment of the present invention, an image processing apparatus includes a designation module configured to designate a tone; a region setting module configured to set an emphasis region of an image; and an image processor configured to convert a tone of the image into the tone designated by the designation module, wherein the image processor is configured to perform a first conversion for the emphasis region and a second conversion for another region.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

According to the present invention, an emphasis region can be differentiated from the other region in appearance in the converted image.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention.

FIGS. 3A, 3B, 3C, 3D, and 3E are diagrams for explaining fineness in the image converting processing.

FIG. 5 is a process diagram illustrating exchange of data between the terminal and the server according to the embodiment.

DETAILED DESCRIPTION OF THE INVENTION

The embodiments of the present invention will be described below with reference to drawings.

First Embodiment

Figure 1:
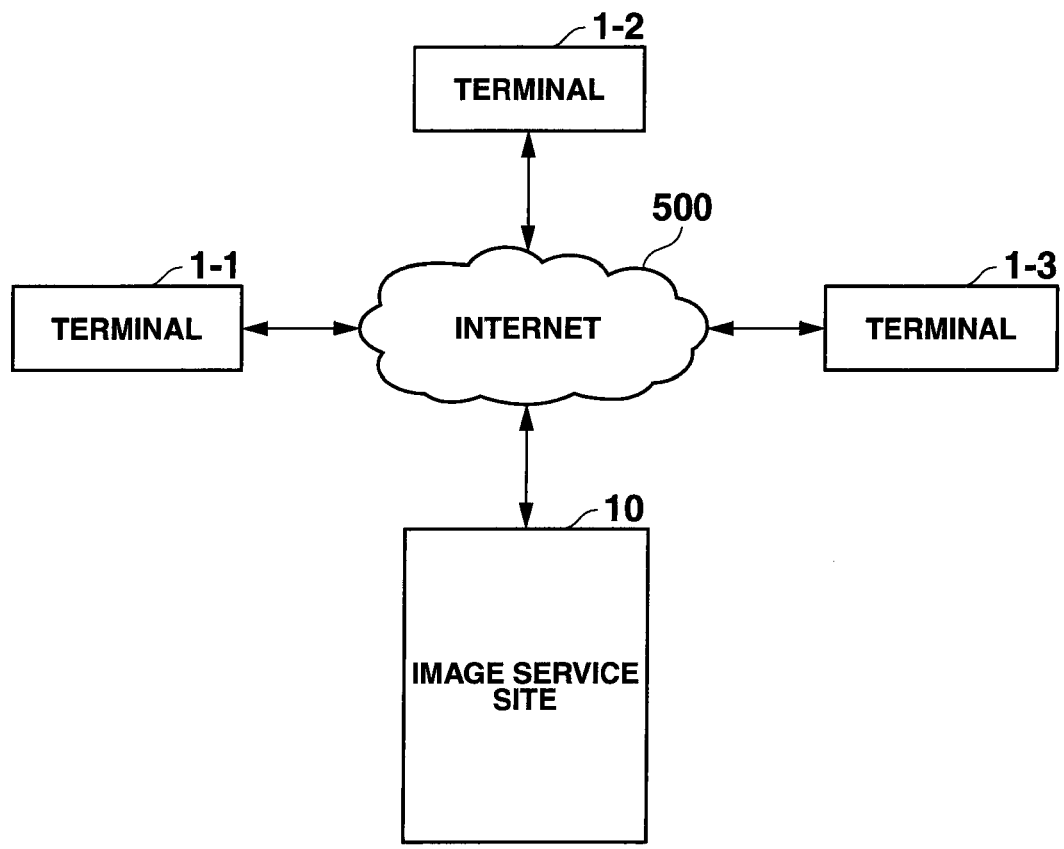
FIG. 1 is a block diagram illustrating a configuration of a network system of an image processing system according to an embodiment of the present invention.

FIG. 1 is a block diagram showing the configuration of a network of an image processing system according to an embodiment of the present invention.

An image service site 10 with a social network service function is connected to terminals 1-1, 1-2, 1-3, . . . via a network such as the Internet 500. The image service site 10 stores image data (mainly image data of a photo shot by a digital camera) uploaded from a user via the terminals 1-1, 1-2, 1-3, . . . , converts the uploaded image into painting image, and also allows other users to browse the uploaded image and the converted painting image.

The image service site 10 stores image data (mainly image data of a photo shot by a digital camera) uploaded from a user via the terminals 1-1, 1-2, 1-3, . . . , converts the uploaded image into painting image, and also allows other users to browse the uploaded image and the converted painting image.

The terminals 1-1, 1-2, 1-3, . . . may be an ordinary personal computer or mobile phone which has a communication function or an image display function.

Figure 2:
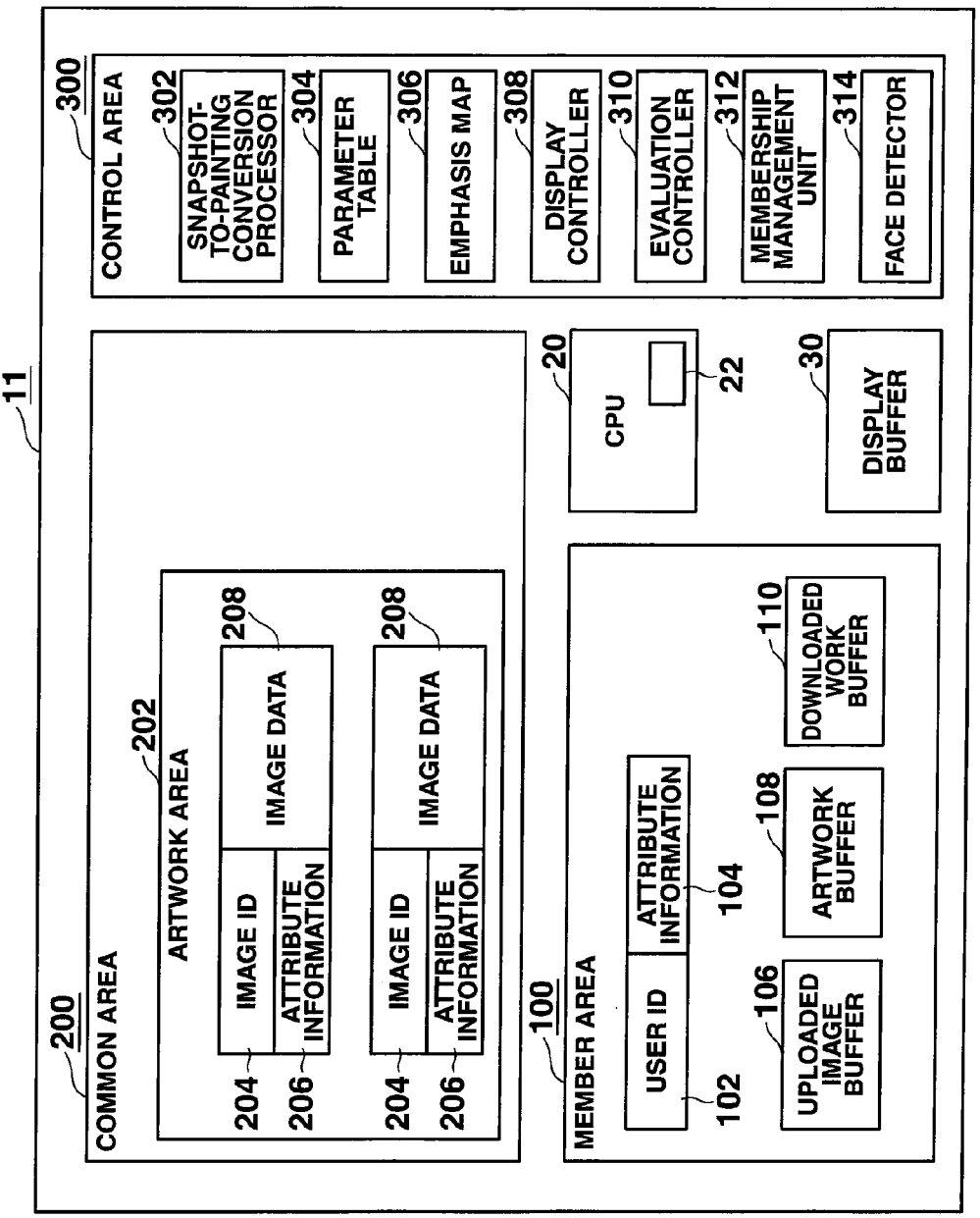
FIG. 2 is a block diagram illustrating a schematic structure of a server according to the embodiment.

FIG. 2 is a block diagram showing principal portions in the configuration of a server 11 included the image service site 10. The server 11 is provided with a member area 100, a common area 200, and a control area 300.

The member area 100 is an area provided for each registered member and stores a user ID 102 to identify each member and various kinds of attribute information 104 for each user corresponding thereto.

The attribute information 104 is user-specific information including the name, handle name, gender, age, region, membership type, and others. The membership type includes a free member registered without charge, a pay member registered on a chargeable basis, and a premium member who pays a special membership fee (for example, an annual membership fee).

The member area 100 includes an uploaded image buffer 106 which stores image data of photos uploaded by the user, an artwork memory 108 which stores painting images (artworks) obtained through snapshot-to-painting conversion by the server 11, and a downloaded artwork memory 110 which stores artworks of other users downloaded from the other users.

The common area 200 is an area provided commonly to all users and includes an artwork area 202 which stores many artworks obtained by snapshot-to-painting conversion of images uploaded by the users.

Each artwork stored in the artwork area 202 has image data 208 stored together with an image ID 204 to identify the artwork and attribute information 206 of the artwork.

The attribute information 206 includes the user ID indicating a contributor of the artwork, date information such as the creation date or posting date, size of image data, image type information such as the type of painting tone, access count information indicating the number of times the artwork is browsed, download count information indicating the number of times the artwork is downloaded, point information indicating evaluation of the artwork, and other information specific to artworks. The creator of the artwork is known from the user ID and whether the creator is a pay member or premium member can be identified.

The control area 300 includes a snapshot-to-painting conversion processor 302, a parameter table 304, an emphasis map 306, a display controller 308, an evaluation controller 310, a membership management unit 312, and a face detector 314.

The snapshot-to-painting conversion processor 302 performs snapshot-to-painting conversion processing that converts image data stored in the artwork memory 108 into painting image data. The face detector 314 detects a face region of an arbitrary person in the image data stored in the artwork memory 108. The parameter table 304 stores parameters for snapshot-to-painting conversion referenced by the snapshot-to-painting conversion processor 302 to perform the snapshot-to-painting conversion processing. The emphasis map 306 stores data indicating an emphasis of pixel in the image and for snapshot-to-painting conversion referenced by the snapshot-to-painting conversion processor 302 to perform the snapshot-to-painting conversion processing. The display controller 308 stores a control program that causes a screen of the terminals 1-1, 1-2, 1-3, . . . to display artworks.

The evaluation controller 310 evaluates artworks stored in the artwork memory 108 of the member area 100 based on the access count or the like and attaches a point to each artwork. The membership management unit 312 manages members based on the user ID and controls services separately for free members, pay members, and premium members. The membership management unit 312 also administers the social network service function of the server 11.

The server 11 is provided with a CPU 20 and a display buffer 30. The CPU 20 controls the whole server 11 (each unit described above) and also performs various kinds of processing needed to display many artworks at a glance on the Internet. The CPU 20 also performs an operation accompanied with a snapshot-to-painting conversion by the snapshot-to-painting conversion processor 302. The display buffer 30 is a work memory to generate images for the display when the CPU 20 causes a display screen to display many artworks at a glance.

Concrete operations of an image processing system according to the present embodiment will be described below with reference to flow charts.

First, processes when an image is uploaded, displayed, browsed, and downloaded between the terminals 1-1, 1-2, 1-3, . . . and the server 11 on the image service site 10 will be described with reference to FIG. 5.

If the user is a member (a free member, pay member, or premium member), the user accesses the server 11 from the terminal of the user (step SB1). The server 11 authenticates the user ID after the user being logged in (step SC1) and, if it is verified that the user is a member, sends a page of the member so that the user can view the page (step SC2).

When the page of the member is opened, the member uploads an image (step SB2). The uploaded image is stored in the uploaded image buffer 106 of the member area 100 of the server. If the member request a snapshot-to-painting conversion of the image (step SB3), the server 11 performs the snapshot-to-painting conversion processing (or image converting processing) (step SC3) and the converted image, that is, the artwork is stored in the artwork memory 108.

If the user uses the terminal 1-1 shown in FIG. 2 to request the server of a snapshot-to-painting conversion at step SB3, the user performs a predetermined operation to display the tone selection menu 801 on the display of the terminal 1-1. The user can select a desired tone on the tone selection menu 801. Information indicating the selected tone is transmitted to the server 11 from the terminal 1-1 as the tone to be converted.

An artwork which is a tone-converted image obtained by the server 11 is transmitted from the server 11 to the terminal 1-1 of the user and displayed on the terminal 1-1.

If the user requests a print operation of the artwork (tone-converted image) at step SB4, the tone-converted image data stored in the artwork memory 108 is transmitted to the printer 12 from the server 11 and is printed (SC4). At step SC4, an artwork is printed on a predetermined print medium based on the painting data (tone-converted image data). The print medium is delivered to the user by an offline manner.

The member may personally enjoy the converted artwork, but may post the artwork if the artwork is desired to be released to other users (step SB4). The posted artwork is transferred from the artwork memory 108 of the member area 100 to the artwork area 202 of the common area 200 and stored there. Incidentally, the attribute information 206 as described with reference to FIG. 2 is attached each artwork in the artwork area 202.

The server 11 displays artworks in the artwork area 202 at a glance if necessary (step SC4). Incidentally, the server 11 resizes artworks in the artwork area 202 when displaying artworks at a glance if appropriate. That is, because the size of artworks in the artwork area 202 is normally larger than the image size for display at a glance, the artworks are reduced and if the size of artworks in the artwork area 202 is smaller than the image size for display at a glance, the artworks are enlarged.

The member can browse any artwork displayed at a glance in an actual size by making a request of browsing (step SB5). If a browsing request is made, the server 11 displays the requested artwork in the actual size (step SC5) and also adds up a point to the artwork whose browsing is requested (step SC6).

The member may press a GOOD button displayed in the page of the member and indicating that the browsed artwork suits his (her) taste or write a comment such as his (her) impressions (step SB6). If the GOOD button is pressed or a comment such as impressions is written, the server 11 adds up a point to the browsed artwork (step SC6). The evaluation of the artwork is thereby raised. It is assumed that the point number of comment writing is higher than the point number of the GOOD button.

The member can also request a download of a browsed artwork (step SB7). If a download request is made by a member, the server 11 permits the download if necessary (step SC7) and the member can download a browsed artwork only if the download is permitted (step SB8). The downloaded artwork is stored in the downloaded artwork memory 110 of the member area 100.

If a download request is made, the server 11 also adds up a point to the artwork (step SC8).

On the other hand, other users other than members, that is, any user can browse artwork stored in the artwork area 202 of the common area 200 in a state of the display at a glance by appropriately accessing the server 11 (step SA1). Further, any user can also browse any artwork displayed at a glance in the actual size by making a request of browsing (step SA2).

Then, if any user presses the GOOD button because the browsed artworks suits his (her) taste (step SA3), the server 11 also adds up a point to the browsed artwork (step SC6).

Next, the technology of snapshot-to-painting conversion processing when the server 11 converts uploaded image data into a painting image will be described.

The snapshot-to-painting conversion is an image processing technology to convert each pixel constituting an original image such as a photo to an artwork according to predetermined parameters (snapshot-to-painting conversion parameters). The artwork includes an oil painting, an impasto, a gothic oil painting, a fauvist oil painting, a watercolor, a gouache, a pastel, a color pencil, a pointillism, a silk screen, a drawing, and an airbrush. These tones are called a style of paintings.

The technology of snapshot-to-painting conversion image processing converts an original image to an image looking like a painting basically by automatically adjusting/combining parameters of various kinds of effect processing known as photo retouch software.

Effect processing includes, for example, texture processing that provides a special texture by mapping the texture to an image and resolution processing that increases the texture and resolution by dividing an image into a contour portion, a texture portion such as a fine pattern, and a flat portion and performing appropriate processing on each portion. The effect processing also includes HSV processing that adjusts the color by dividing the color into three elements of the hue, saturation, and value, RGB processing that adjusts the degree of each color of R(red), G(green), and B(blue), and RGB substitution processing that makes a substitution in the direction of R to G, G to B, and B to R. The effect processing also includes an edge extraction processing that applies a filter called a Laplacian filter and an intermediate density extraction processing that applies a filter called a median filter. The effect processing also includes a density extraction processing that performs processing when a histogram in RGB of adjacent pixels is extracted to extract minimum/intermediate/maximum densities, an equalize processing that corrects the contrast or enlarges an image's histogram by setting the darkest portion of an image as black, the brightest portion as white, and appropriately distributing a histogram therebetween, a gamma correction processing that adjusts an intermediate brightness while maintaining a bright portion and a dark portion, and a shadow processing that brightens a dark portion of an image or darkens a bright portion thereof. The effect processing also includes a solarization processing that when the RGB value of each pixel is brighter than a threshold, inverts the RGB value thereof and a noise addition processing that adjusts the quantity and color of noise by randomly drawing dots to cause noise.

The effect processing also includes an effect processing called HDR (High Dynamic Range) in which a photo with a wide dynamic range that cannot be expressed by an ordinary photo is compressed into a narrow dynamic range width through tone mapping to correct whiteout due to overexposure and black crushing due to underexposure so that power of expression is increased. By applying this effect processing, an image realizing a new photo expression that brings a photo closer to memories or impressions a person's brain has received and adds an artistic expression can be obtained.

That is, the snapshot-to-painting conversion processing is in principle a kind of effect processing and a snapshot-to-painting conversion algorithm creates various kinds of painting tone by appropriately combining effect processing and parameters and is programmed as the snapshot-to-painting conversion processing.

In the conversion algorithm, a parameter group P, which is a set of the parameters to convert pixels of an original image, is prepared in advance. If there are 12 kinds of painting tones, parameter groups are represented as P1 to P12. How to determine parameters also changes the tone of a converted image. If the parameter group for the conversion into an oil painting tone is P1 and there are m parameters in P1 needed for effect processing to convert an image so as to look like a painting tone image, the parameter group P1 contains a plurality of parameters $P1_1$ to $P1_m$.

Generally, pixels are expressed by gradation of a plurality of bits of each of R, G and B. Parameters are elements for carrying out an operation for bit data. For example, coefficients "2", "0.9" and "0.5" which are used when an operation "R×2, G×0.9, B×0.5" is performed to emphasize a red component and slightly suppress a green component and a blue component are parameters.

As another example, emphasis degrees which are used in the case where operation elements are programmed in advance and an operation "R×1.1" is performed when the emphasis degree of red is 1, an operation "R×1.2" is performed when the emphasis degree of red is 2, and an operation "R×1.3" is performed when the emphasis degree of red is 3 are also parameters.

In addition, there are cases where a predetermined operation is performed between a target pixel and adjacent pixels. For example, as illustrated in FIG. 3A, when a target pixel A5 (RGB) is located in the center and pixels A1 (RGB), A2 (RGB), A3 (RGB), A4 (RGB), A5 (RGB), A6 (RGB), A7 (RGB), A8 (RGB), and A9 (RGB) are arranged above, under, on the left, and on the right of the target pixel A5, an operation "A5(R)=A1(R)×q1+A2(R)×q2+A3(R)×q3+A4(R)×q4+A5(R)×q5+A6(R)×q6+A7(R)×q7+A8(R)×q8+A9(R)×q9" is performed for A5(R), and the same operation is performed for G and B. The element "q" in the operation is a parameter, and different effect processing can be performed by changing the value (coefficient).

In addition, there is effect processing to process the image to change the touch.

Specifically, pixels which closely correlate with each other based on colors are collected from pixels which form the image data, and grouped. Then, for pixels of each of the groups, the colors of pixels which belong to the same group are replaced by a representative color of the group. The group of pixels, colors of which are replaced by the representative color, forms each touch. According to the image processing described above, a touch which is formed can be changed, by changing correlation between pixels collected as a group and changing the shape (length (distance), flatness) of the group formed of pixels of the same color (representative color). As a result, it is possible to change the tone of the image indicated by the image data to various pictorial tones. In addition, an optimum combination of parameters such as correlation used for each processing, and the length and flatness which indicate the shape of the group is set for each tone.

Figure 4A:
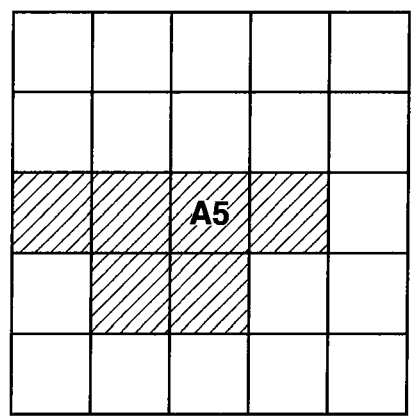
FIGS. 4A and 4B are diagrams for explaining a shape of a stroke in the image converting processing.
Figure 4B:
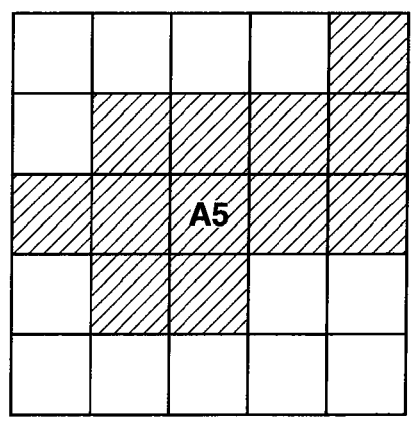

For example, when the shape of the group formed of pixels which closely correlate with the target pixel A5 is the shape illustrated in FIG. 4A or FIG. 4B, the shape illustrated in FIG. 4A has larger flatness and shorter length (distance) than those of the shape illustrated in FIG. 4B.

Changing each of a plurality of image data items into different touches can be realized by controlling the shape of each group obtained by collecting pixels forming a touch, for example, controlling the flatness of the group, when the tone is changed. The touch is thickened when the flatness of the group formed of pixels of the same color which indicates the touch is increased, and consequently the touch of the image is displayed in a coarse manner. A small touch can be formed by decreasing the flatness of the group formed of pixels of the same color, and consequently the touch of the image is displayed in a fine manner.

The snapshot-to-painting conversion algorithm detailed above is stored in the snapshot-to-painting conversion processor 302 in the control area 300 of the server 11. The parameters are also stored in the parameter table 304 of the control area 300.

Figure 6:
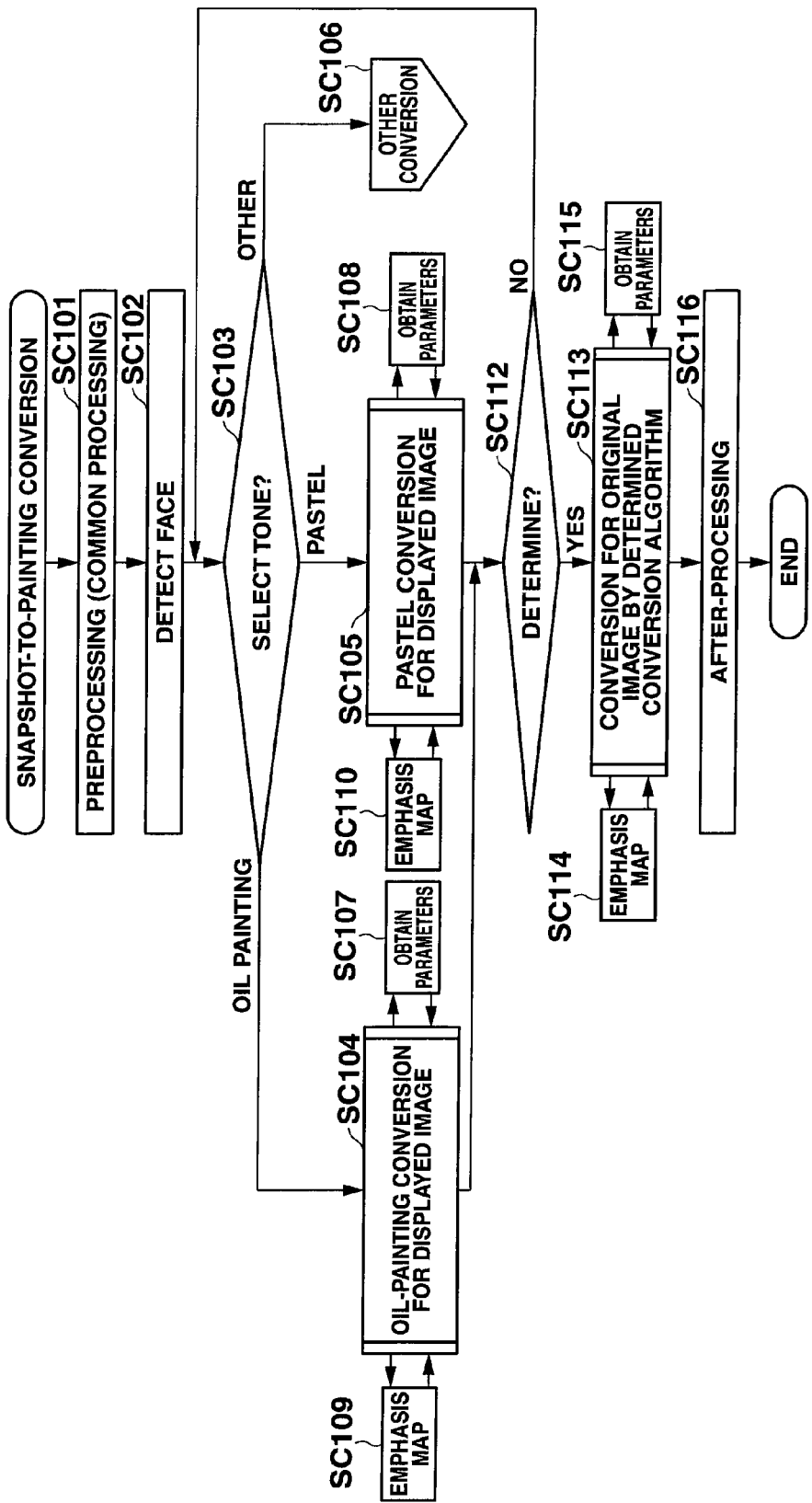
FIG. 6 is a flowchart for explaining image converting processing according to the embodiment.

FIG. 6 is a flowchart illustrating the snapshot-to-painting conversion processing performed by the snapshot-to-painting conversion processor 302. In the server 11, the snapshot-to-painting conversion processor 302 performs preprocessing, as illustrated in FIG. 6 (Step SC101). This is processing which is performed in common, regardless of the type of the tone.

The effect processing described above is performed for each pixel, and thus it is necessary that the image data is in the bit map form. Therefore, the snapshot-to-painting conversion processor 302 converts the image data, which is generally expressed in JPEG, into the bit map form.

In addition, since the image data items which are uploaded from the terminals 1-1, 1-2, 1-3 . . . have various sizes, the snapshot-to-painting conversion processor 302 resizes the image data items to the number of pixels of the display area, for example, 800×600 pixels. Images of a larger size are reduced, and images of a smaller size are enlarged. This is because fixed parameters can be used for images of a fixed size, and thus the processing can be performed efficiently. As a matter of course, snapshot-to-painting conversion is performed for the image having the size of the uploaded image data, in snapshot-to-painting conversion described later.

Next, the snapshot-to-painting conversion processor 302 checks by face detection processing whether the image to be converted includes a face or not (Step SC102). This is performed to subject a face region of the image to snapshot-to-painting conversion which is different from snapshot-to-painting conversion for other parts, since the face region which is subjected to extreme conversion becomes unnatural. More specifically, the face region should be subjected to snapshot-to-painting conversion processing with conversion intensity lower than that for the other parts, or more detailed snapshot-to-painting conversion processing than that for the other parts. Basically, this is checked to subject the image to be converted to snapshot-to-painting conversion processing such that the face region in the converted image is closer to that in the original image to be converted than the other parts are.

The term "detailed" means that the group of pixels which are subjected to effect processing is reduced. For example, in the case of smoothing or airbrushing, a group is formed between pixels adjacent to the target pixel A (x, y), an average of the pixels is obtained, values of the pixels in the group are replaced by the average value, and thereby smoothing or airbrushing is performed. For example, when pixels A1, A2, A3, A4, (A5), A6, A7, A8, and A9 are adjacent to the target pixel A5 serving as the center, suppose that grouping four pixels of A2, A4, A6, and A8 located above, under, on the left and on the right of the pixel A5 (see FIG. 3B) is more detailed than grouping eight pixels of A1 to A9 around the pixel A5 (see FIG. 3C) and grouping 24 pixels also including pixels around the eight pixels (see FIG. 3D) (the opposite of "detailed" is "coarse").

According to the type of the tone, a group of an irregular shape may be formed as illustrated in FIG. 3E. Also in this case, suppose that subjecting a smaller group to snapshot-to-painting conversion for each smaller number of pixels is more detailed than subjecting a group of a large number of pixels together to snapshot-to-painting conversion.

In the same manner, also with respect to the touch, suppose that processing groups, each of which is formed of a small number of pixels as illustrated in FIG. 4A, many times is more detailed than processing groups, each of which is formed of a large number of pixels as illustrated in FIG. 4B, few times.

In the face detection processing, as will be described later by using the flow chart in FIG. 7, emphasis changes even in an image between a face region and the background or between a center portion and a peripheral portion and thus, the snapshot-to-painting conversion processor 302 creates an emphasis map indicating an emphasis of pixel in the object image and stores it into the emphasis map 306 in the control area 200.

The emphasis indicates a degree of importance for the viewer, and indicates a degree of emphasis in terms of technique.

Subsequently, the snapshot-to-painting conversion processor 302 causes the user to select the desired painting tone from the oil painting, impasto, gothic oil painting, fauvist oil painting, watercolor, gouache, pastel, color pencil, pointillism, silk screen, drawing, and airbrush. (step SC103).

If the painting tone is selected, the snapshot-to-painting conversion processor 302 proceeds to the flow of each painting tone conversion algorithm. If, for example, the oil painting tone is selected, the snapshot-to-painting conversion processor 302 proceeds to step SC104 and if the pastel painting tone is selected, the snapshot-to-painting conversion processor 302 proceeds to step SC105. Otherwise, the snapshot-to-painting conversion processor 302 proceeds to the flow of other painting tone conversion algorithms (step SC106). Incidentally, when executing each algorithm, the snapshot-to-painting conversion processor 302 references the parameter table 304 and the emphasis map 306 of the control area 300 (steps SC107, SC108, SC109, SC110).

In the processing in steps SC104, SC105, SC106, the snapshot-to-painting conversion processor 302 makes a snapshot-to-painting conversion intended for image data of the display screen size. If a decision is instructed from the terminal 1-1 of the user (step SC112: YES), proceeds to the snapshot-to-painting conversion of the original image (step SC113) and, if redoing in another painting tone is instructed (step SC112: NO), returns to the processing in step SC103.

For the snapshot-to-painting conversion of the original image in step SC113, the snapshot-to-painting conversion processor 302 performs painting tone conversion processing on the original image based on the painting tone conversion algorithm determined in step SC112 while referencing the parameter table 304 and the emphasis map 306 (steps SC114, SC115). If the image sizes are different, appropriate parameters are different even if the painting tone is the same and thus, the parameter table used in step SC115 is different from parameters used in step SC107 or SC108.

Then, the snapshot-to-painting conversion processor 302 performs post-processing to convert the converted original image back to the JPEG format (step SC116).

Next, the face detection processing in step SC102 by the snapshot-to-painting conversion processor 302 described above and a procedure for creating an emphasis map will be described with reference to FIGS. 7 to 9A, 9B, and 9C.

Figure 7:
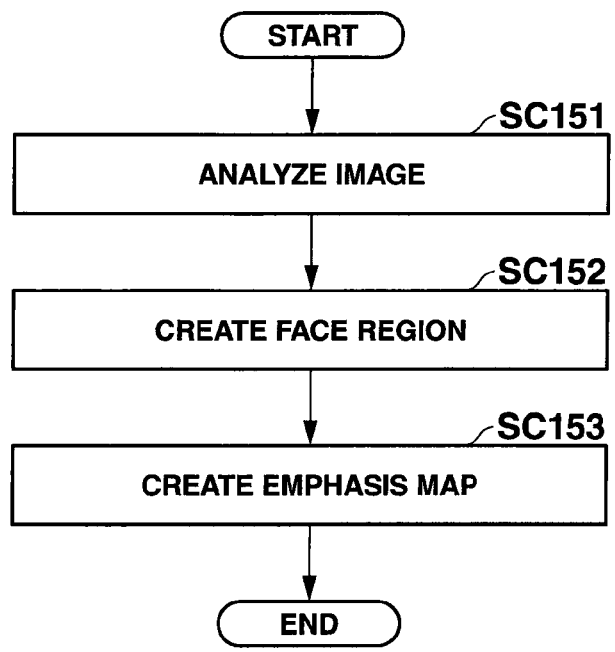
FIG. 7 is a diagram illustrating attribute information of an image ID according to the embodiment.

In the face detection processing, as shown in FIG. 7, the snapshot-to-painting conversion processor 302 first analyzes the target image data to determine whether there is any face therein (step SC151). Any known face detection technology can be used and thus, a detailed description thereof is omitted.

In the face detection processing, even if a face is detected, it is difficult to accurately extract the contour thereof and thus, the snapshot-to-painting conversion processor 302 sets an elliptic or rectangular region containing a face region to the image data (step SC152).

Figure 8:
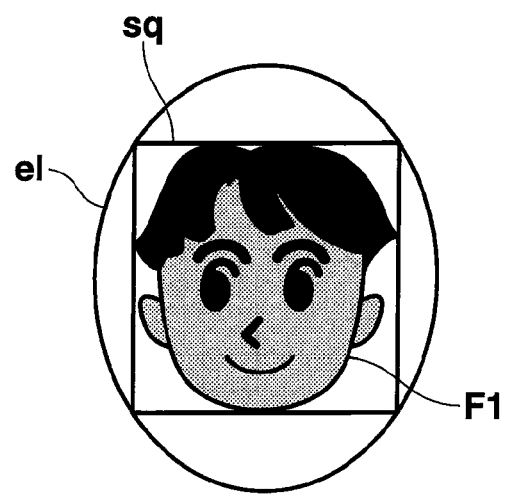
FIG. 8 is a diagram for explaining face region creation according to the embodiment.

FIG. 8 is a diagram illustrating a region containing a face region. A rectangular region "sq" contains a face F1 and an elliptic region "el" contains the face F1. Thus, the regions "sq" and "el" correspond to the detected face regions. The rectangular region "sq" contains the detected face and the elliptic region "el" contains the rectangular region "sq".

Figure 9A:
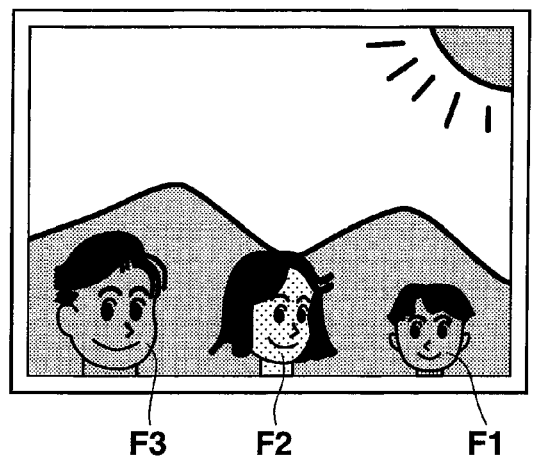
FIGS. 9A, 9B, and 9C are diagrams for explaining an emphasis map.
Figure 9B:
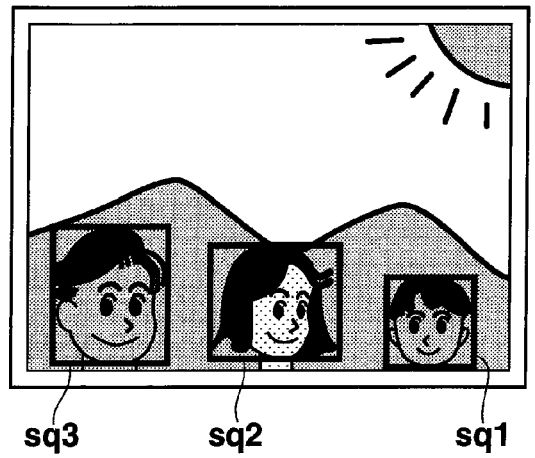
Figure 9C:
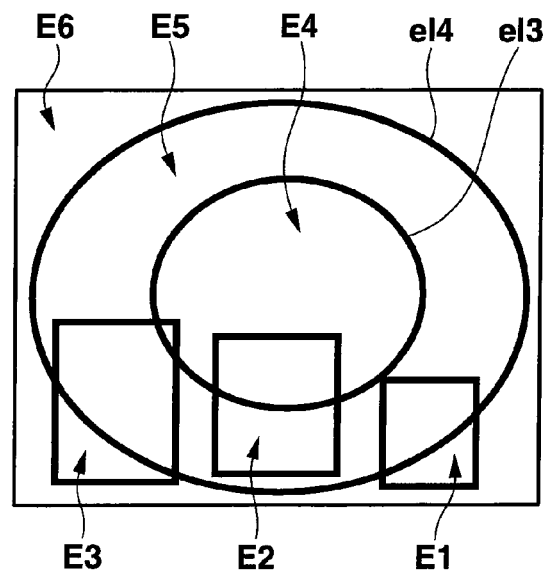

Then, the snapshot-to-painting conversion processor 302 creates an emphasis map (step SC153). FIGS. 9A, 9B, and 9C are diagrams illustrating the emphasis map. In the processing in step SC153, if the snapshot-to-painting conversion processor 302 detects faces F1, F2, F3 from image data as shown in FIG. 9A, the snapshot-to-painting conversion processor 302 sets face regions sq1, sq2, sq3 as shown in FIG. 9B to the image data. In FIG. 9B, it is assumed that the face regions sq1, sq2, sq3 are rectangle regions.

Then, the snapshot-to-painting conversion processor 302 sets the face regions sq1, sq2, and sq3 as first regions E1, E2, and E3 with the first level of emphasis.

Further, the snapshot-to-painting conversion processor 302 sets the central region indicated by an ellipse e13 as a second region E4 with the second level of emphasis. The major axis of the ellipse e13 is a half of the width of the screen and the minor axis of the ellipse e13 is a predetermined percent of the major axis.

Further, the snapshot-to-painting conversion processor 302 sets the background region indicated by an ellipse e14 encircle the ellipse e13 as a third region E5 with the third level of emphasis. In FIG. 9C, the size and the flatness of the ellipse e14 is determined such that the ellipse e14 can be contacted to all of four sizes of an image.

Finally, the snapshot-to-painting conversion processor 302 sets the peripheral region outward of the third region E5 as a fourth region E6 with the fourth (lowest) level of emphasis.

FIG. 9C shows an idea of the emphasis map. The emphasis map indicates an order of emphasis or importance among the first regions E1, E2, and E3, second region E4, third region E5, and fourth region E6 or a relative emphasis or importance among the four regions. The snapshot-to-painting conversion processor 302 stores data indicating the order of emphasis in the emphasis map 306 in the control area 300.

Then, when performing snapshot-to-painting conversion processing on each pixel of image data at steps SC104, SC105, SC 106, or SC113, the snapshot-to-painting conversion processor 302 sets low conversion intensity for the region with a high level of emphasis, and sets high conversion intensity for the region with a low level of emphasis to perform snapshot-to-painting conversion, or perform more detailed snapshot-to-painting conversion for the region with a high level of emphasis than that for the region with a low level of emphasis, based on the emphasis map illustrated in FIG. 9C.

Since many effect processing, which vary according to the type of the tone, are performed in the snapshot-to-painting conversion (see FIGS. 10A to 10D), low or detailed conversion intensity is set for each conversion processing. Performing the snapshot-to-painting conversion together results in performing the snapshot-to-painting conversion by setting low conversion intensity for the region with a high level of emphasis, and setting high conversion intensity for the region with a low level of emphasis, and performing more detailed snapshot-to-painting conversion for the region with a high level of emphasis than that for the region with a low level of emphasis. Therefore, the processing of setting the conversion intensity exists together with the processing of setting the detail degree.

As a result, in the painting image after snapshot-to-painting conversion, the region with a high level of emphasis has a little difference from the original image, and the region with a low level of emphasis has a large difference from the original image. The first regions E1, E2, and E3 with the highest level of emphasis, i.e., the face regions sq1, sq2, and sq3 have a little difference from the original image compared to the other regions.

Therefore, even when a human face exists in the original image, the atmosphere of the face does not deteriorate, and natural snapshot-to-painting conversion can be performed. It is an example as a matter of course, and the face regions sq1, sq2, and sq3 may not be subjected to snapshot-to-painting conversion to prevent deterioration of the atmosphere of the face.

The conversion intensity in the snapshot-to-painting conversion will be explained in detail hereinafter. The magnitude of the conversion intensity basically means the size of parameters explained above. Specifically, the magnitude of the conversion intensity means the size of parameters P1 to Pm which are necessary for the effect processing mentioned as an example above, the elements (coefficients) with which an operation is performed for bit data of each of R, G and B of each pixel, the color emphasis degree, a value (coefficient) q which is used when a predetermined operation is performed between the target pixel and adjacent pixels, and the shape (such as length and flatness) of the pixel group used when a touch is expressed. Specifically, the difference of a part of the painting image from the original image increases as the parameters increase.

Generally, conversion of an image means mapping the original image onto another image. When mapping is performed, a predetermined conversion is performed. In the conversion, a difference between the original image and the image obtained by conversion is small when a conversion coefficient (parameter) is small. When the conversion coefficient is the minimum, there is no difference between the original image and the image obtained by conversion, and the same image is obtained. When the conversion coefficient is large, a difference between the original image and the image obtained by conversion becomes conspicuous.

Conversion of an image can be indicated by the following expression, when a pixel value of the original image is A, a pixel value of an image obtained by conversion is B, and the conversion algorithm is f:

$$B=f(A)$$

The reference symbol f represents, for example, a plurality of types of effect processing, such as texture processing, HSV processing, Laplacian filtering, or median filtering. In addition, the reference symbol f represents processing of converting an image into, for example, an oil-painting tone image, or a pastel tone image.

Figure 10A:
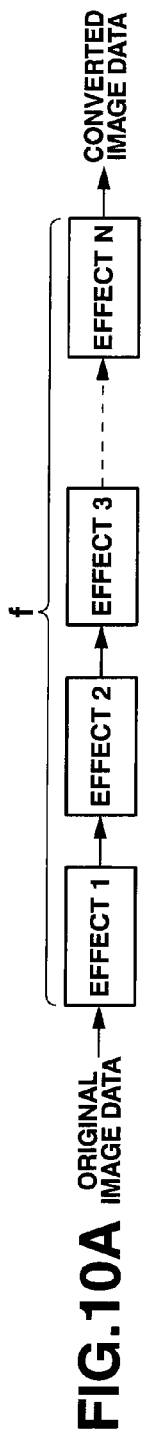
FIGS. 10A, 10B, 10C, and 10D are diagrams for explaining image conversion using the emphasis map.

FIG. 10A is a diagram which schematically illustrates the contents of processing of snapshot-to-painting conversion as generalization. As illustrated in FIG. 10A, the conversion algorithm actually includes individual algorithms of a plurality of types of effect processing 1 to N.

Figure 10B:
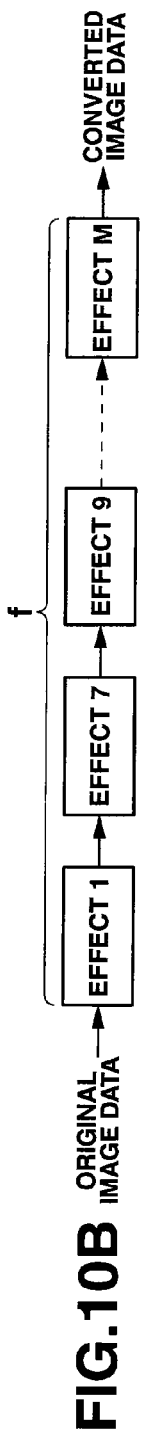

FIG. 10B is a schematic diagram which corresponds to FIG. 10A, and illustrates processing performed when a target tone is a certain tone. As illustrated in FIG. 10B, the conversion algorithm includes algorithms of specific types of effect processing 1, 7, ... and M which correspond to the target tone.

On the other hand, conversion of an image, which includes elements of the conversion intensity can be indicated by the following expression:

$$B=f(A,I)$$

Reference symbol I represents intensity.

For example, photo-retouch software which is generally used in personal computers can perform various image processing, intensity of which can be controlled. The intensity which is controlled in the image processing corresponds to the value of I.

The conversion algorithm f includes not only processing of maintaining the position of a pixel (x, y), but also processing of moving the position of a pixel or a group of pixels. For example, a distorted image can be obtained by moving a pixel of (x1, y1) to (x3, y4), and moving pixels around the pixel together. In this case, the conversion intensity increases as the moving distance increases. In addition, the conversion algorithm f also includes various airbrushing processing. For example, in the airbrushing processing of setting an average value of surrounding pixels for a target pixel, the conversion intensity increases as the number of surrounding pixels increases.

In the snapshot-to-painting conversion at the Steps SC104, SC105, SC106, and SC113 described above, different conversion intensities are set for the four regions shown in the emphasis map. Specifically, in snapshot-to-painting conversion, a target pixel to be processed is subjected to processing, to which a conversion intensity I that is set for the region including the target pixel is applied. Thereby, the original image is converted into a painting image, in which the face region has a little difference from that of the original image, and the background region has a large difference from that of the original image.

Figure 10C:
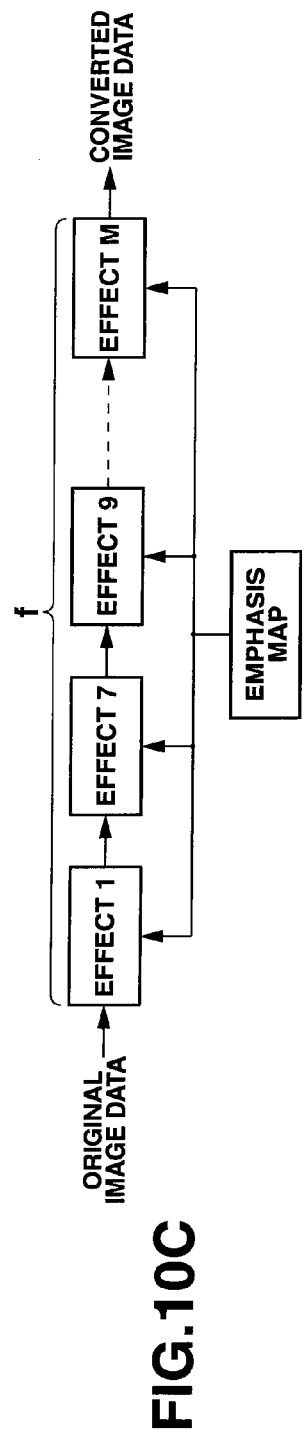

FIG. 10C is a diagram which corresponds to FIG. 10B and schematically illustrates the contents of processing of snapshot-to-painting conversion, to which the conversion intensity I that is set for the region including the target pixel is applied. As illustrated in FIG. 10C, in the snapshot-to-painting conversion, processing which reflects the conversion intensity I corresponding to the region shown in the face region map is performed for the target pixel, in each of a plurality of types of effect processing 1, 7, 9, ... and M. As a result, the original image is subjected to snapshot-to-painting conversion in which the conversion intensity for the face regions is different from the conversion intensity for the background region.

In short, in snapshot-to-painting conversion at steps SC104, SC105, SC106, and SC113 described above, the processing of the above expression "B=f(A, I)" is performed for all the pixels of the image data, and the value of I is changed according to whether the pixel belongs to the face region or the background region. Some types of the target tone include effect processing on which the conversion intensity I is not reflected.

In addition, when the emphasis of each region of E1 to E6 shown by the above emphasis map 306 is represented by α, α includes the same number of pixels as that of the image data, and the conversion operation of the pixel A is as follows:

$$A(RGB)(x,y)=A(RGB)(x,y)*P1*\alpha(x,y)$$

$$A(RGB)(x,y)=A(RGB)(x,y)*P2*\alpha(x,y)$$

$$A(RGB)(x,y)=A(RGB)(x,y)*Pn*\alpha(x,y)$$

((x, y) represents two-dimensional coordinates)

It means that influence of the parameters varies according to the value of α.

Therefore, above snapshot-to-painting conversion can be processing in which the conversion intensity for each region shown in the emphasis map 306 is reflected on an a value (transmission information of each pixel, which is different from color expression data R, G, and B) which forms an a map which is publicly known (see Jpn. Pat. Appln. KOKAI Publication No. 2002-325171 and Jpn. Pat. Appln. KOKAI Publication No. 2009-237927), and a blending is performed for a converted image temporarily obtained by snapshot-to-painting conversion with a conversion algorithm according to the tone and the original image.

Figure 10D:
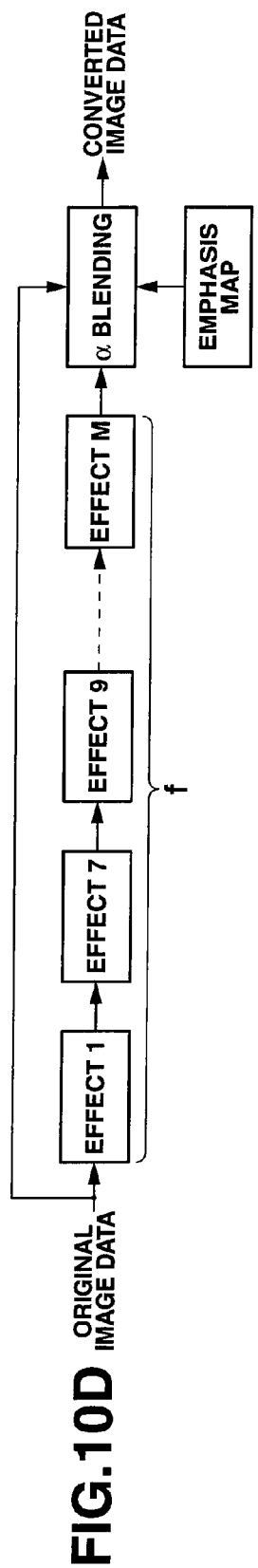

FIG. 10D is a diagram which corresponds to FIG. 10C and schematically illustrates the contents of processing of snapshot-to-painting conversion by a blending.

Snapshot-to-painting conversion by a blending is indicated by the following expression, when the original pixel value is A, the converted pixel value is B, and each pixel value of the α map is α (0.0 to 1.0):

$$B = \alpha \times A + (1.0 - \alpha) \times f(A)$$

Therefore, for example, when a converted image is superposed on and blended with the original image, a degree of expressing the original image through the converted image can be increased in the regions (sq1, sq2, and sq3 in FIG. 9B) having the lowest conversion intensity, by increasing the α value of pixels in the region having a low conversion intensity (a high level of emphasis), and decreasing the α value of pixels in the region having a high conversion intensity (a low level of emphasis). Specifically, it is possible to reduce a difference of the region a low conversion intensity (a high level of emphasis) from the original image and increase a difference of the region a high conversion intensity (a low level of emphasis) from the original image, in the painting image which is obtained in the end.

It is sufficient to prepare six types of emphasis data items, supposing that the inside of each region E1 to E6 has uniform emphasis, and it is unnecessary to provide the emphasis with the same number of pixels as that of the image data. In addition, more subdivision may be performed, such as applying an intermediate value to an overlapping area.

Figure 11:
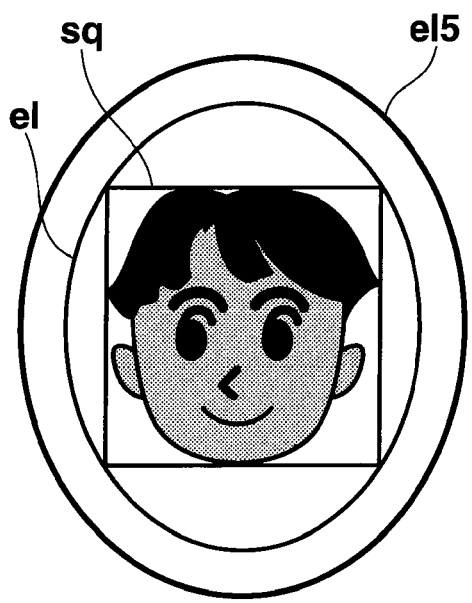
FIG. 11 is a diagram for explaining a boundary of the face region.

FIG. 11 illustrates a state where a region (boundary region) of an outline part of the face region sq is further divided. For example, when conversion intensity is varied between the inside and the outside of the outline of the face region "sq", a difference in level in which a difference in atmosphere is evident may be generated in the painting image. Therefore, an oval region "el" as illustrated in FIG. 11 may be set outside the face region "sq", an oval region "e15" which encloses the region el and a size larger than the region "el" may be set outside the region "el", and the conversion intensities of the regions "sq", "el", and "el5" may have the relation "sq<el<el5". The same is applicable to the case where more detailed snapshot-to-painting conversion is performed for the face region "sq" than that for the background region. Thereby, the outline part of the face can be subjected to snapshot-to-painting conversion in stages to have natural impression.

According to the present embodiment described above, when a photographic image including a main subject is converted into a painting image, it is possible to differentiate the emphasis region, in which the main subject exists, from the other region in appearance in the converted painting image. In particular, different conversion intensities are used for the emphasis region and the other parts, thereby unnaturalness of the whole painting image is removed, and snapshot-to-painting conversion which produces natural appearance can be realized.

The present invention is not limited to the structure explained in the above embodiment, but structures of the constituent elements may be properly modified or changed as a matter of course.

In addition, the present embodiment shows the structure in which an image in which the region of high emphasis has a little difference from the original image and the region of low emphasis has a large difference from the original image is generated as the painting image obtained by snapshot-to-painting conversion. However, it is possible to adopt a structure in which an image in which a region of high emphasis has a large difference from the original image, that is, the region of high emphasis is more emphasized than the region of low emphasis, is generated as painting image obtained by snapshot-to-painting conversion, which is contrary to the present embodiment. Specifically, it is possible to dare to emphasize the main subject.

As an example of application, there is the case of generating a painting image for the purpose of performing special printing to cause a specific region in the image to stand out.

Besides, the present embodiment shows the structure in which four types of regions having different emphases, that is, the first regions E1, E2, E3, the second region E4, the third region E5, and the fourth region E6 are set in the original image, and snapshot-to-painting conversion is performed by assigning different conversion intensities corresponding to the respective emphases to regions E1 to E6.

However, for example, only the first region E1 to the third region E5 may be set as the emphasis region of the present invention in the original image, only the first region E1 and the second region E4 may be set as the emphasis region of the present invention, or only the first region E1 may be set as the emphasis region of the present invention.

In addition, although the present embodiment is explained with an example of the case where a region which corresponds to a human face is set as the emphasis region (region of the highest emphasis), the emphasis region may be a region of an animal face such as a dog and a cat, or a desired subject part such as a building, a car, the sky, and the sea, not a face.

Although the emphasis regions are automatically extracted in the present embodiment, it is possible to adopt a structure of enabling the user to designate a desired region as an emphasis region. Although any method may be adopted as the method of enabling the user to designate a desired region as an emphasis region and the method of specifying the designated emphasis region, the following method may be adopted as an example.

Figure 12A:
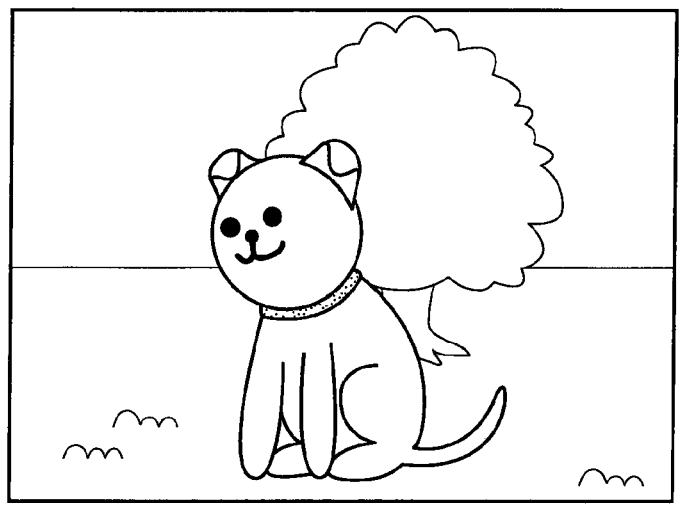
FIGS. 12A and 12B are diagrams explaining designation of an emphasis region in the embodiment.
Figure 12B:
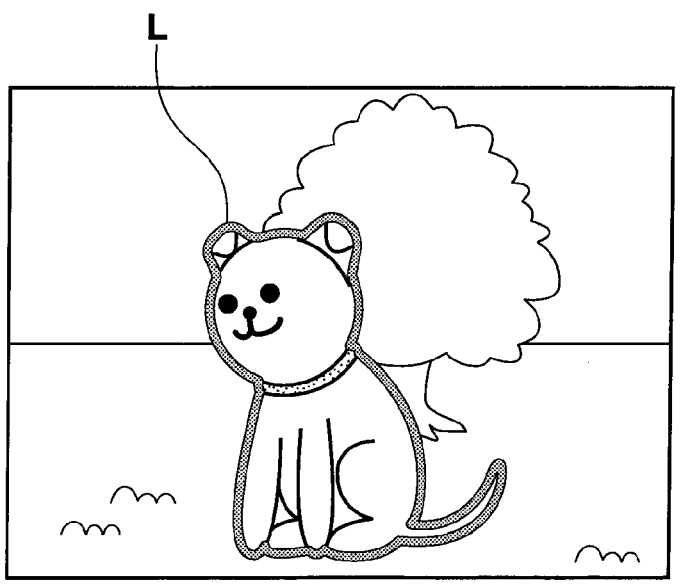

For example, the user of the terminal 1 is caused to touch the screen of the terminal 1 to trace an outline of a subject part in a desired image by operating the touch panel on the screen. During the operation, the server 11 successively obtain a series of coordinate data items which indicate a locus of the touch position in the screen, and performs outline extraction for the whole image. Then, in the extracted outline, a region which is enclosed by an outline in a position that most agrees with the locus of the touch position is set as the emphasis region. FIGS. 12A and 12B are diagrams illustrating an example of the case where the user is caused to designate a desired region as emphasis region. FIG. 12A is an example of the original image, and FIG. 12B is an example of an outline L which encloses the emphasis region designated by the user.

In addition, the present embodiment shows an example in which snapshot-to-painting conversion is performed as tone conversion. The present invention is not limited to snapshot-to-painting conversion, however, but may be applied to another tone conversion as long as it converts a tone of the original image to another tone which includes a desired artificial characteristic.

Besides, although the present embodiment shows the case where the present invention is applied to the server 11 which realizes the image service site 10, the present invention can be applied to any desired apparatus, as long as the apparatus has a function of performing desired effect conversion for an image. The apparatus includes, for example, a digital camera, a digital photo frame which has a main purpose of displaying photographic images taken by a digital camera for viewing, and a general-purpose personal computer.

The present invention is not limited to the embodiment and the modification described above, but may be properly changed within a range in which the advantageous effect of the present invention can be obtained. The changed embodiment is also included in a range of the invention described in the claims, and a range of an invention which is equal to the invention.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means. For example, a region which corresponds to a face may be cut out of the image data 208, the region corresponding to the face and the other region may be subjected to snapshot-to-painting conversion separately from each other, and thereafter combined with each other.

What is claimed is:

1. An image processing apparatus comprising:
   a region setting module configured to set an important region in image data;
   a degree-of-importance map creation module configured to create a degree-of-importance map indicating a degree of importance corresponding to the important region of the image data set by the region setting module;
   an image processor configured to perform a first conversion of a tone of image data of the important region into a first tone and a second conversion of a tone of image data of another region other than the important region into a second tone, in accordance with the degree-of-importance map created by the degree-of-importance map creation module;
   a locus obtaining module configured to obtain a locus of positions designated in a screen displaying the image data; and
   an outline extraction module configured to extract an outline from the image data,
   wherein the region setting module is configured to set, as the important region, a region surrounded by an outline which is extracted by the outline extraction module and which most agrees with the locus obtained by the locus obtaining module;
   wherein the image processor is configured to perform the first conversion and the second conversion with different tone conversion intensities, such that the first conversion has a lower tone conversion intensity than the second conversion.

2. The image processing apparatus of claim 1, wherein the first conversion and the second conversion use different conversion parameters.

3. The image processing apparatus of claim 1, wherein the region setting module is configured to set a central region of the image data as an important region.

4. The image processing apparatus of claim 1, wherein the region setting module is configured to set plural important regions.

5. The image processing apparatus of claim 4, wherein the plural important regions have different degrees of importance, respectively.

6. The image processing apparatus of claim 1, wherein the degree-of-importance map is configured to indicate a degree of importance of each pixel of the image data.

7. The image processing apparatus of claim 1, wherein the first tone obtained from the first conversion is finer than the second tone obtained from the second conversion.

8. An image processing method for instructing a computer of an image processing apparatus, the method comprising:
   setting an important region in image data;
   creating a degree-of-importance map that indicates a degree of importance corresponding to the set important region;
   performing a first conversion of a tone of image data of the important region into a first tone and performing a second conversion of a tone of image data of another region other than the important region into a second tone, in accordance with the degree-of-importance map;
   obtaining a locus of positions designated in a screen displaying the image data; and
   extracting an outline from the image data;
   wherein the setting of the important region comprises setting, as the important region, a region surrounded by an outline which is extracted in the extracting and which most agrees with the obtained locus, and
   wherein the first conversion and the second conversion are performed with different tone conversion intensities, such that the first conversion has a lower tone conversion intensity than the second conversion.

9. A non-transitory computer-readable storage medium having stored thereon a program that is executable by a computer of an image processing apparatus to cause the computer to function as:
   a region setting module configured to set an important region in image data;
   a degree-of-importance map creation module configured to create a degree-of-importance map indicating a degree of importance corresponding to the important region of the image data set by the region setting module;
   an image processor configured to perform a first conversion of a tone of image data of the important region into a first tone and a second conversion of a tone of image data of another region other than the important region into a second tone, in accordance with the degree-of-importance map created by the degree-of-importance map creation module;
   a locus obtaining module configured to obtain a locus of positions designated in a screen displaying the image data; and
   an outline extraction module configured to extract an outline from the image data,
   wherein the region setting module is configured to set, as the important region, a region surrounded by an outline which is extracted by the outline extraction module and which most agrees with the locus obtained by the locus obtaining module, and
   wherein the image processor is configured to perform the first conversion and the second conversion with different tone conversion intensities, such that the first conversion has a lower tone conversion intensity than the second conversion.

* * * * *